(12) United States Patent
Chang et al.

(10) Patent No.: US 7,570,325 B2
(45) Date of Patent: Aug. 4, 2009

(54) TRANSFLECTIVE TYPE LIQUID CRYSTAL DISPLAY

(75) Inventors: Hoon Jo Chang, Seoul (KR); Dong Hae Suh, Seoul (KR); Young Il Park, Seoul (KR)

(73) Assignee: Hydis Technologies Co., Ltd., Gyeonggi-Do (KR)

( * ) Notice: Subject to any disclaimer, the term of this patent is extended or adjusted under 35 U.S.C. 154(b) by 421 days.

(21) Appl. No.: 11/367,901

(22) Filed: Mar. 3, 2006

(65) Prior Publication Data
US 2007/0085949 A1  Apr. 19, 2007

(30) Foreign Application Priority Data
Oct. 14, 2005  (KR) ............... 10-2005-0096891

(51) Int. Cl.
G02F 1/1333 (2006.01)
G02F 1/1335 (2006.01)
G02F 1/1343 (2006.01)

(52) U.S. Cl. ............... 349/114; 349/84; 349/104; 349/106; 349/113; 349/139

(58) Field of Classification Search ............... 349/84, 349/104, 106, 113, 114, 139
See application file for complete search history.

(56) References Cited

U.S. PATENT DOCUMENTS

| 2004/0257496 A1* | 12/2004 | Sonoda et al. | 349/95 |
| 2005/0083462 A1* | 4/2005 | Lin | 349/114 |
| 2006/0017871 A1* | 1/2006 | Morimoto et al. | 349/114 |
| 2006/0187391 A1* | 8/2006 | Hwang | 349/114 |
| 2007/0146597 A1* | 6/2007 | Kashima | 349/117 |
| 2008/0043182 A1* | 2/2008 | Luo et al. | 349/113 |
| 2008/0043186 A1* | 2/2008 | Hong | 349/114 |

* cited by examiner

*Primary Examiner*—Frank G Font
*Assistant Examiner*—Jerry Blevins (57) ABSTRACT

Disclosed is a transflective liquid crystal display having a high opening ratio and a single cell gap structure, which includes first and second substrates arranged opposite each other and respectively having reflective and transmissive regions; an opposite direction reflector disposed on the first substrate for reflecting introduced light to the transmissive regions; a color filter formed on the first substrate; transparent electrodes formed on the color filter; a lower polarization plate attached on the first substrate; common electrodes formed on the second substrate; an upper polarization plate attached on the second substrate; and a liquid crystal layer interposed between the first and second substrates, wherein the liquid crystal layer corresponding to the reflective region includes a fixing retardation area in which introduced light is always subjected to a constant phase difference.

18 Claims, 6 Drawing Sheets

FIG.1

(PRIOR ART)

FIG.2

(PRIOR ART)

FIG.4B transmission type

TRANSFLECTIVE TYPE LIQUID CRYSTAL DISPLAY

BACKGROUND OF THE INVENTION

1. Field of the Invention

The present invention relates to a transflective type liquid crystal display, and more particularly to a single gap transflective type liquid crystal display having a high opening ratio.

2. Description of the Prior Art

Liquid crystal displays are classified into two types of liquid crystal display, namely a transmissive type liquid crystal display using a backlight as a light source and a reflective type liquid crystal display using a natural light as a light source. The transmissive type liquid crystal display can brightly display images under dark circumstances because of using the backlight as the light source, which has a disadvantage in that the backlight causes high power consumption of the transmissive type liquid crystal display. Meanwhile, the reflective type liquid crystal display uses natural light as the light source without using a backlight, resulting in low power consumption of the reflective type liquid crystal display. However, the reflective type liquid crystal display has a disadvantage in that it is impossible to use the reflective type liquid crystal display under dark circumstances.

Accordingly, a transflective type liquid crystal display has been proposed which is to compensate for disadvantages of the transmissive and reflective type liquid crystal displays. The transflective type liquid crystal display can be used in both transmissive and reflective manners, resulting in a relatively low power consumption and use under dark circumstance.

Such a transflective liquid crystal can be generally manufactured by processes of fabricating a lower array substrate (hereinafter, referred to as a lower substrate) including a thin transistor, a reflective electrode, and a transmissive electrode, fabricating an upper color filter substrate (hereinafter, referred to as an upper substrate) including a color filter and a common electrode, and forming a liquid crystal layer between the lower and upper substrates after attaching the two substrate to each other.

Figure 1:
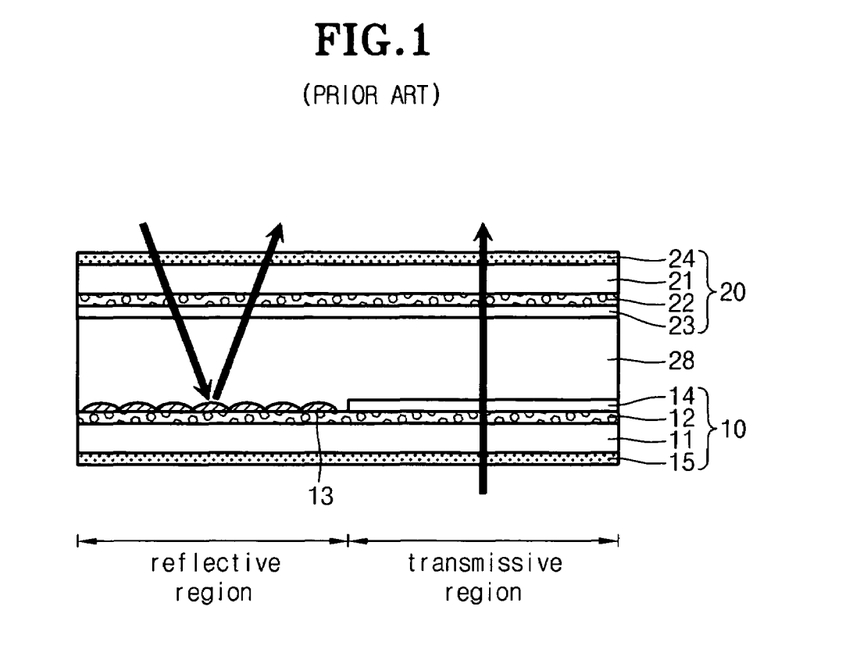
FIG. 1 is a sectional view showing a single cell gap transflective liquid crystal display according to a conventional art.
Figure 2:
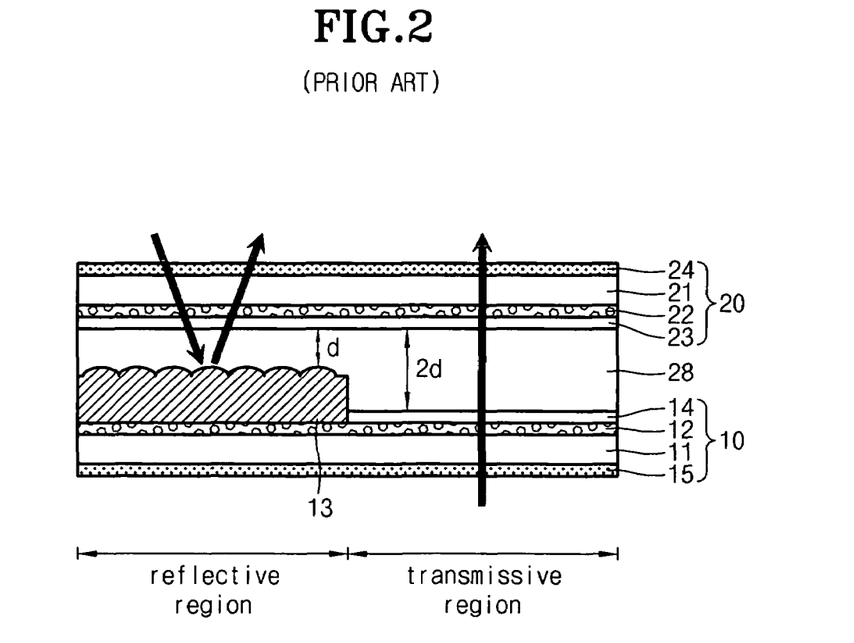
FIG. 2 is a sectional view showing a dual cell gap transflective liquid crystal display according to a conventional art.

FIGS. 1 and 2 are views illustrating a transflective liquid crystal display according to a conventional art. Here, FIG. 1 is a sectional view showing the transflective liquid crystal display having a single cell gap, and FIG. 2 is a sectional view showing the transflective liquid crystal display having a dual cell gap.

Referring to FIGS. 1 and 2, the lower substrate 10 and the upper substrate 20 are disposed opposite each other. A liquid crystal layer 28 including a plurality of liquid crystal is interposed between the lower and upper substrates 10 and 20.

The lower substrate 10 includes a lower glass plate 11, a $\lambda/4$ phase-compensation plate 12 disposed on a surface of the lower glass plate 11, a reflective electrode 13 and a transmissive electrode 14 formed on the $\lambda/4$ phase-compensation plate 12, and a lower polarizing plate 15 attached on the other surface of the lower glass plate 11.

The upper substrate 20 includes an upper glass plate 21, a $\lambda/4$ phase-compensation plate 22 disposed on a surface of the upper glass plate 21, a color filter 23 including a black matrix (not shown) and formed on the $\lambda/4$ phase-compensation plate 22, and an upper polarizing plate 24 attached on the other surface of the upper glass plate 21.

In the transflective liquid crystal display having the single cell gap, as shown in FIG. 1, there is no step portion between the reflective region in which the reflective electrode 13 is placed and the transmissive region in which the transmissive electrode 14 is located, resulting in the same cell gap in the reflective region and the transmissive region.

On the other hand, in the transflective liquid crystal display having the dual cell gap, as shown in FIG. 2, there is a ½ cell gap between the reflective region in which the reflective electrode 13 is placed and the transmissive region in which the transmissive electrode 14 is located.

However, the conventional transflective liquid crystal display has following disadvantages.

First, as the transflective liquid crystal display is generally designed with reference to (based on) the reflective region, the reflective region has a phase retardation two times greater than that in the transmissive region of the transflective liquid crystal display having the single cell gap shown in FIG. 1. Therefore, a transmittance of the transmissive region is 50% less than that of the reflective region due to the phase difference between the transmissive and reflective regions, resulting in a transmittance difference between the regions.

In order to improve irregular transmittance between the reflective region and the transmissive region, the transflective type liquid crystal display must have a dual cell gap shown in FIG. 2. In the transflective type liquid crystal display having the dual cell gap, the cell gap of the reflective region is equal to half of the cell gap of the transmissive region. However, since a light path in the reflective region is two times longer than that in the transmissive region, the phase retardation in the reflective region is the same as that in the transmissive region, thereby causing the reflective and the transmissive regions to have an equal transmittance or similar transmittances.

The transflective liquid crystal display having the dual cell gap has a step portion between the transmissive and reflective regions, whereas the transflective liquid crystal display having the single cell gap has no step portion. This step portion makes a manufacture of the transflective liquid crystal display difficult, thereby causing a decrement in productivity of the transflective liquid crystal display.

Next, the conventional transflective liquid crystal display has the black matrix widely formed on the upper substrate in order to prevent leakage of light resulting form a misalignment of the lower and upper substrates. Thus, this causes the opening ratio to decrease.

In both of the transflective liquid crystal display having the single cell gap and the transflective liquid crystal display having the dual cell gap, further, light is transmitted twice through the color filter in the reflective region, rather than in the transmissive region, thereby causing a difference in reappearance capability of colors between the reflective region and the transmissive region.

Furthermore, both of the transflective liquid crystal display having the single cell gap and the transflective liquid crystal display having the dual cell gap have at least two phase compensating plates. The phase compensation plates cause an increased cost of the transflective liquid crystal displays.

In addition, the above-mentioned conventional transflective liquid crystal display has an uneven reflection electrode in order to increase reflexibility of the light introduced into the reflective region from outside, e.g. to evenly disperse the light reflected by the reflection electrode even though the light is introduced from all directions into the reflection electrode. However, since processes of forming prominence and depression on the reflection electrode are highly complicated, it is difficult to manufacture the uneven reflection electrode.

SUMMARY OF THE INVENTION

Accordingly, the present invention has been developed in order to solve the above-mentioned problems occurring in the prior art, and a first object of the present invention is to provide a transflective liquid crystal display which has the same transmittance in both of a reflective region and a transmissive region.

A second object of the present invention is to provide a transflective liquid crystal display which can be manufactured without the difficult processes typically caused by a step portion between the reflective and transmissive regions.

A third object of the present invention is to provide a transflective liquid crystal display which can prevent an opening ratio from being reduced due to a black matrix.

A fourth object of the present invention is to provide a transflective liquid crystal display which can decrease manufacturing cost by excluding the use of a phase compensation plate.

A fifth object of the present invention is to provide a transflective liquid crystal display which has equal reappearance capability of colors in the reflective and transmissive regions thereof.

A sixth object of the present invention is to provide a transflective liquid crystal display which can be manufactured by excluding a process of forming an unevenness on the reflective electrode thereof.

In order to accomplish these objects of the present invention, there is provided a transflective liquid crystal display, which comprises: first and second substrates arranged to be opposite each other and respectively divided into reflective and transmissive regions; an opposite direction reflector disposed in the reflective region on an inner surface of the first substrate for reflecting introduced light to the transmissive regions adjacent to both sides of the reflector; a color filter formed on the whole inner surface of the first substrate including the opposite direction reflector; transparent electrodes formed on a portion of the color filter in the transmissive regions; a lower polarization plate attached on an outer surface of the first substrate; common electrodes formed in the transmissive regions on the inner surface of the second substrate; an upper polarization plate attached on the outer surface of the second substrate; and a liquid crystal layer interposed between the first and second substrates, wherein the reflective region and the transmissive region have a single cell gap, and the liquid crystal layer corresponding to the reflective region includes a fixing retardation area in which introduced light is always subjected to a constant phase difference.

Here, the opposite direction reflector is formed in a region between pixel regions having a thin film transistor forming portion, which acts as a black matrix in order to prevent light from leaking to a region other than the pixel regions.

The opposite direction reflector has a shape selected from a group of a conical shape having a constant angle of inclination, a circular shape, and a trigonal pyramid shape, so that an upper surface of the reflector reflects the light introduced from outside in opposite directions.

The opposite direction reflector has a height equal to half that of the color filter.

The common electrodes of the second substrate are formed not in the reflective region but only in the transmissive regions.

The lower polarization plate and the upper polarization plate are disposed so that their transmissive axes intersect with each other, and the liquid crystal layer is arranged in a twist nematic mode in which liquid crystals are twisted at an angle of 90 degrees.

The lower polarization plate and the upper polarization plate are disposed so that their transmissive axes are parallel with each other, and the liquid crystal layer is arranged in a vertical align mode in which liquid crystals stand vertically when electric voltage is not applied to the liquid crystal layer.

The fixing retardation area is an area of the first and second substrates in which electrodes for operating the liquid crystals are not formed.

In order to accomplish the objects of the present invention, there is provided a transflective liquid crystal display, which comprises: first and second substrates arranged to be opposite each other and respectively divided into reflective and transmissive regions; an opposite direction reflector disposed in the reflective region on an inner surface of the first substrate for reflecting introduced light to the transmissive regions adjacent to both sides of the reflector; an organic resin film formed on a whole inner surface of the first substrate including the opposite direction reflector; transparent electrodes formed on a portion of the organic resin film in the transmissive region; a lower polarization plate attached on an outer surface of the first substrate; a color filter formed in the transmissive regions on the inner surface of the second substrate; common electrodes formed on the color filter; an upper polarization plate attached on an outer surface of the second substrate; and a liquid crystal layer interposed between the first and second substrates, wherein the reflective region and the transmissive region have a single cell gap, and the liquid crystal layer corresponding to the reflective region includes a non-phase retardation area in which introduced light is not always subjected to a constant phase difference.

The opposite direction reflector is formed in a region between pixel regions having a thin film transistor forming portion, which acts as a black matrix in order to prevent the light from leaking to a region other than the pixel regions.

The opposite direction reflector has a shape selected from a group of a conical shape having a constant angle of inclination, a circular shape, and a trigonal pyramid shape, so that an upper surface of the reflector reflects the light introduced from outside in opposite directions.

The opposite direction reflector has a height equal to half that of the color filter.

The color filter and the common electrodes of the second substrate are formed not in the reflective region but only in the transmissive regions.

The lower polarization plate and the upper polarization plate are disposed so that their transmissive axes are parallel with each other, and the liquid crystal layer is arranged in a vertical align mode in which liquid crystals stand vertically when an electric voltage is not applied to the liquid crystal layer.

The lower polarization plate and the upper polarization plate are disposed so that their transmissive axes intersect with each other, and the liquid crystal layer is arranged in a twist nematic mode in which liquid crystals are twisted at an angle of 90 degrees.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings.

First, technological principles of the present invention will be briefly described. The transflective liquid crystal display according to the present invention employs a sing cell gap structure. The transflective liquid crystal display includes a lower substrate having a color filter attached thereto, twist nematic type liquid crystal, and an opposite direction reflector for reflecting introduced light to transmissive regions adjacent thereto and a reflective region having a fixing retardation area in which a constant phase retardation occurs.

In this case, since the transflective liquid crystal display of the present invention employs the single cell gap structure, it is possible to reduce a transmittance difference between the reflective region and the transmissive region, and to solve a difficulty in the manufacture of the transflective liquid crystal display, which is caused by the existence of a step portion between the reflective region and the transmissive region.

Further, since the transflective liquid crystal display of the present invention has a color filter attached on a lower substrate, it is possible to minimize a difference in reappearance capability of colors due to a different light pathways between the reflective region and the transmissive region.

In addition, since the transflective liquid crystal display of the present invention has an opposite direction reflector disposed between pixel regions, the efficient use of space can highly increase and it is possible to prevent an opening ratio from decreasing due to the black matrix by omitting a formation of the black matrix.

Further, the transflective liquid crystal display of the present invention excludes the use of a phase compensation plate, so as to reduce the manufacturing cost thereof which may otherwise increase due to the use of the phase compensating plate.

In addition, since the transflective liquid crystal display of the present invention includes the opposite direction reflector having surfaces reflecting light in opposite directions, it is unnecessary to form prominence and depression on a surface of the reflection electrode. Thus, very difficult processes can be omitted, so as to more easily carry out the manufacturing process.

Figure 3:
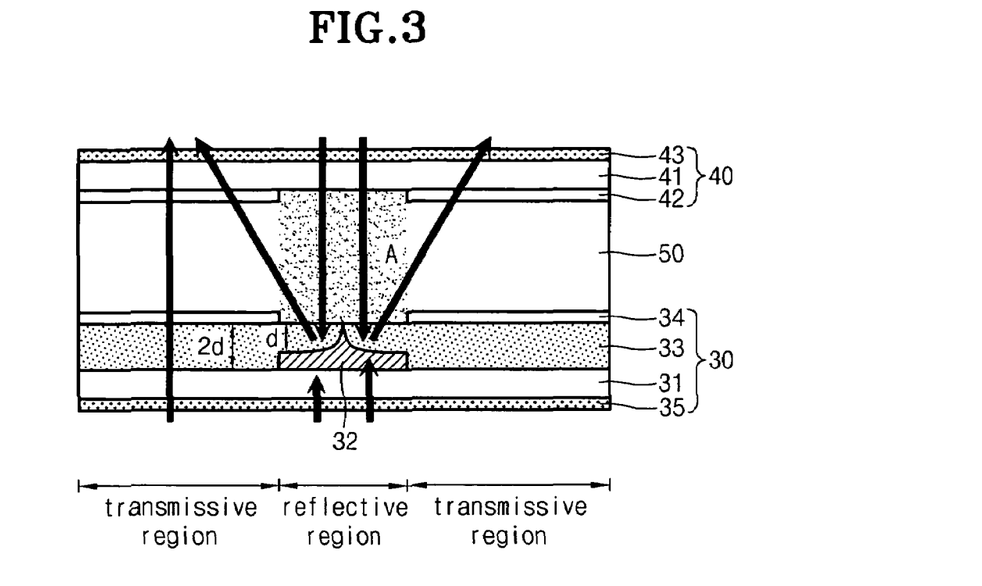
FIG. 3 is a sectional view showing a transflective liquid crystal display according to an embodiment of the present invention.

Specifically, FIG. 3 is a sectional view showing the transflective liquid crystal display according to an embodiment of the present invention. Hereinafter, the transflective liquid crystal display will be described.

As shown in FIG. 3, the transflective liquid crystal display of the present invention includes lower and upper substrates 30 and 40 disposed to be located opposite each other and having a reflective region and a transmissive region which are both partitioned, and a liquid crystal layer 50 interposed between the substrates 30 and 40. In the transflective liquid crystal display according to the present invention, the transmissive region corresponds to a conventional pixel region, while the reflective region corresponds to a region, between pixel regions, which is covered with a conventional black matrix. Further, the transflective liquid crystal display of the present invention has a single cell gap structure.

The lower substrate 30 includes a lower glass substrate 31, an opposite direction reflector 32 formed in a reflective region on an inner surface of the lower glass substrate 31, a color filter 33 formed on the inner surface of the lower glass substrate 31 so as to cover the reflector 32, a transparent electrode 34 formed of a transparent metal, such as Indium-Tin-Oxide (ITO) in transmissive regions on the color filter 33, and a lower polarization plate 35 attached to an outer surface of the lower glass substrate 31.

Here, the opposite direction reflector 32 is formed in a region between the pixel regions including a thin film transistor forming portion and has an upper surface having a shape which enables introduced light to be reflected toward the pixel areas at both sides thereof (i.e. toward transmissive regions), for example, a concave conical shape maintaining a predetermined curvature. Since the opposite direction reflector 32 has the upper surface which has a concave conical shape maintaining the predetermined curvature, the very difficult process of forming the prominences and depressions need not be performed separately. Thus, the present invention allows the manufacturing process to be easily performed.

Further, the opposite direction reflector 32 are disposed between the pixel regions including the thin film transistor. Thus, the opposite direction reflector 32 plays a role as the black matrix to prevent the light from leaking to regions other than the pixel region. In the present invention, therefore, the formation of the opposite direction reflector 32 excludes a formation of the black matrix. Thus, the present invention can prevent a decrement in the opening ratio which results from the black matrix, and the efficiency of the space used can increase.

The color filter 33 includes red, green, and blue filters corresponding to each pixel region, which is formed on the inner surface of the lower glass substrate 31 in order to cover the opposite direction reflector 32. As described above, the color filter 33 has thickness 2 d two times more than a thickness d of the opposite direction reflector 32, in order to minimize the difference of the reappearance of color between the reflective region and the transmissive region. Since the present invention has the color filter 33 formed on the lower substrate 30, it is possible to solve the difference of the reappearance of the color between the reflective region and the transmissive region, compared with the conventional transflective liquid crystal display having a color filter formed on an upper substrate.

The transparent electrode 34 is formed not on the opposite direction reflector 32 but in the transmissive region, i.e. the pixel regions.

Next, the upper substrate 40 includes an upper glass substrate 41, a common electrode 42 formed of the transparent metal, such as Indium-Tin-Oxide (ITO), on an inner surface of the upper glass substrate 41, and an upper polarization plate 43 attached on the outer surface of the upper glass substrate 41.

Here, the common electrodes 42 are formed in the transmissive regions in which the transparent electrode 34 is formed on the lower substrate 30, excluding for the reflective region in which the opposite direction reflector 32 is formed.

The lower and upper polarization plates 35 and 43 are arranged so that their transmission axes extend in such a way that their axes intersect with each other.

The liquid crystal layer 50 includes liquid crystals arranged in a twist nematic mode in which the liquid crystals are twisted at ninety degrees when no electric voltage is applied.

In the transflective liquid crystal display according to an embodiment of the present invention, the lower and upper substrate 30 and 40 have no electrodes for operating the liquid crystals in the reflective region between the pixel regions, in which the opposite direction reflector 32 is disposed, so that the liquid crystals of the reflective region can not be operated regardless of the application of electric voltage to the liquid crystals. Thus, the reflective region is referred to as a fixing retardation area A in which the light is subjected to a constant phase difference. Therefore, the transflective liquid crystal display of the present invention includes the fixing retardation area, thereby compensating for the phase difference between the reflective region and the transmissive region without loss of the light, even though a separate phase difference compensating film is not installed in the transflective liquid crystal display. As a result, the present invention can reduce the manufacturing cost of the transflective liquid crystal display by eliminating the use of the phase compensation film.

Figure 4A:
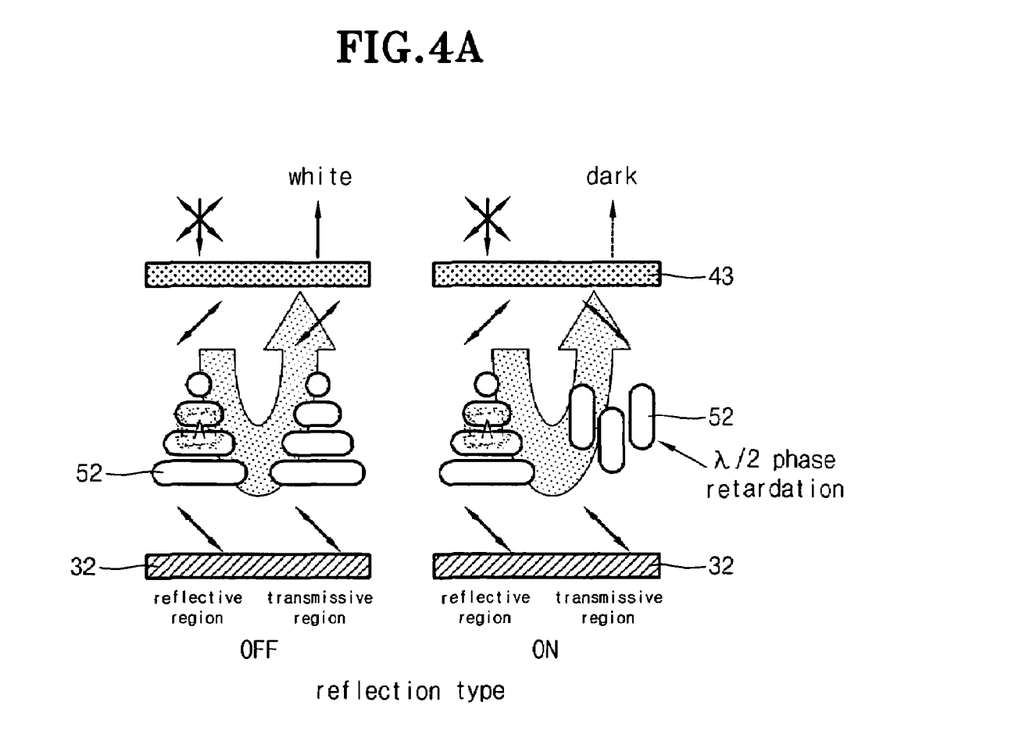
FIGS. 4A and 4B are views illustrating a phase change in the transflective liquid crystal display according to the embodiment of the present invention.
Figure 4B:
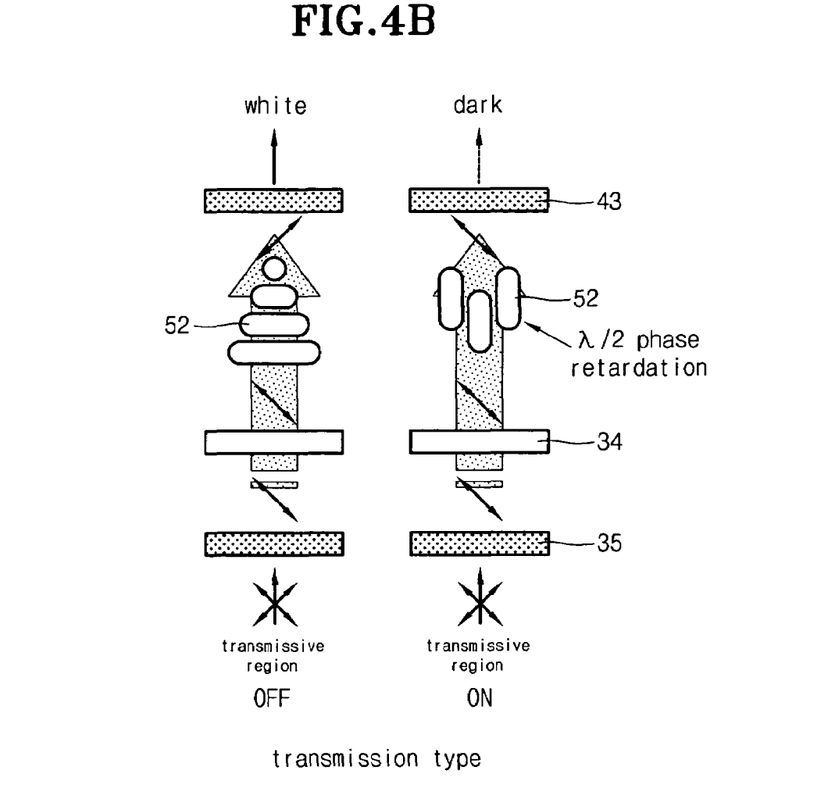

FIGS. 4A and 4B are views illustrating a phase change in the transflective liquid crystal display according to the embodiment of the present invention, in which FIG. 4A is a view illustrates a phase change in a reflective region and FIG. 4B is a view illustrating a phase change in transmissive regions of the liquid crystal display.

Referring to FIG. 4A, in the reflective liquid crystal display, since the liquid crystals 52 are twisted by an angle of 90 degrees and arranged in both the reflective and transmissive regions when the electric voltage is not applied to the reflective liquid crystal display, the light which is introduced in the reflective region through the upper polarization plate 43 is subjected to the phase change at the angle of 90 degrees by the liquid crystal 52. Then, the light is reflected by the opposite direction reflector 32 to the transmissive region, while being subjected again to the phase change at the angle of 90 degrees by the liquid crystal 52. On the other hand, the reflective region comes to be the fixing retardation area A because the electrodes for operating liquid crystals are not provided to the upper and lower substrates, when the electric voltage is applied to the liquid crystal display. Further, the liquid crystals 52 in the reflective region are kept in state of being twisted at an angle of 90 degrees, but the liquid crystals 52 in the transmissive region stand vertically. Thus, the light introduced into the reflective region is subjected, by the liquid crystals 52, to the phase change at an angle of 90 degrees and then reflected by the opposite direction reflector 32 to the transmissive region without the phase change.

Therefore, in the case of the reflective liquid crystal display, when the electric voltage is not applied to the liquid crystal display, the light introduced from outside is subjected twice to the phase change and then transmitted in an initial state. That is, the light becomes a linear polarized light parallel with a transmissive axis of the upper polarization plate 43 and is transmitted through the upper polarization plate 43 out of the liquid crystal display, so as to enter a white state. On the other hand, when the electric voltage is applied to the liquid crystal display, as the light introduced from outside is subjected once to the phase change and becomes a linear polarized light perpendicular to the transmissive axis of the upper polarization plate 43, the light is not transmitted out of the liquid crystal display, so as to enter a dark state.

Referring to FIG. 4B, in the transmissive liquid crystal display, the light is subjected to the phase change in only the transmissive region of the liquid crystal display in the same principle as that in the reflective liquid crystal display. In this case, no fixing retardation area exists. Accordingly, when the electric voltage is not applied to the liquid crystal display, the light is subjected once to the phase change because the lower polarization plate 35 and the upper polarization plate 43 are arranged so that their transmissive axes intersect perpendicularly to each other. That is, the light transmitted from the lower polarization plate 35 to the upper polarization plate 43 becomes a linear polarized light which is parallel to a transmissive axis of the upper polarization plate 43 and is transmitted through the upper polarization plate 43 out of the liquid crystal display, so as to realize a white state. On the other hand, when the electric voltage is applied to the liquid crystal display, the light is not subjected to the phase change and is transmitted to the upper polarization plate 43. The light which arrives at the upper polarization plate 43 becomes the linear polarized light perpendicular to the transmissive axis of the upper polarization plate 43. Thus, the light cannot be transmitted through the upper polarization plate 43 out of the liquid crystal display, so as to realize a dark state.

In FIGS. 4A and 4B, arrows indicate directions of the transmissive axes of the polarization plates and the phases of the light, respectively.

Figure 5:
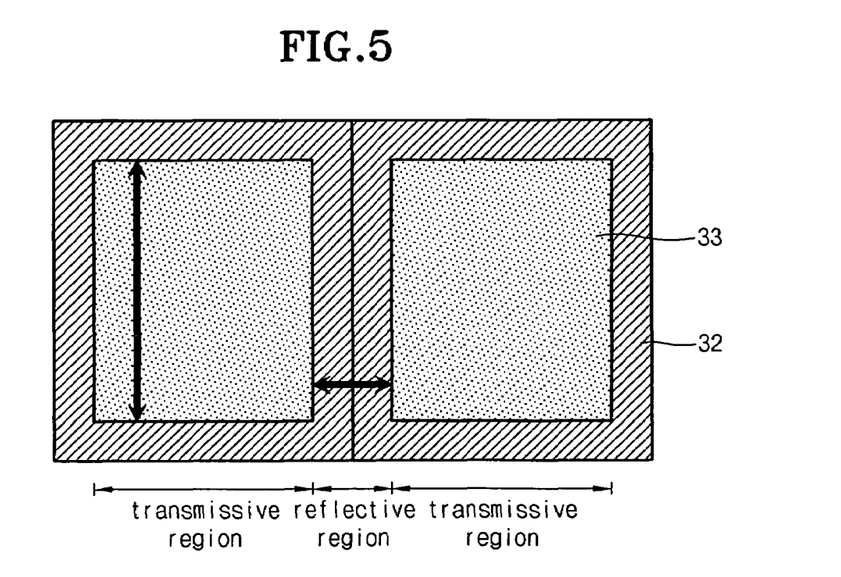
FIGS. 5 and 6 are views illustrating an opposite direction reflector of the transflective liquid crystal display according to an embodiment of the present invention.
Figure 6:
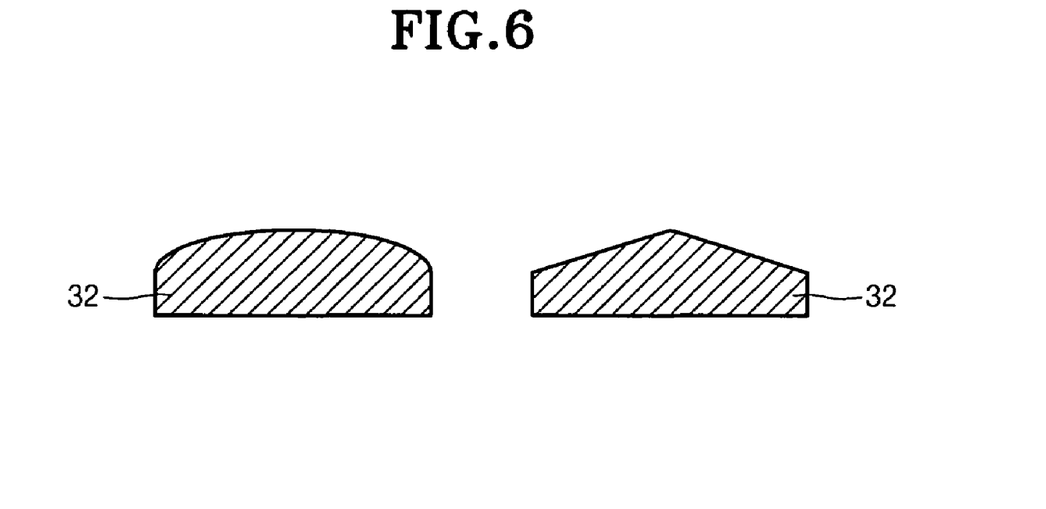

FIGS. 5 and 6 are views illustrating an opposite direction reflector of the transflective liquid crystal display according to the embodiment of the present invention.

As shown in FIG. 5, the opposite direction reflector 32 of the present invention is disposed in a reflective region between the pixel regions having thin film transistors respectively, compared with the conventional liquid crystal display. The pixel regions which have no opposite direction reflector 32 become transmissive regions which are covered with a color filter 33.

Accordingly, the transflective liquid crystal display of the present invention can improve the efficiency in use of space. Specially, since the opposite direction reflector 32 plays a role as a black matrix, the present invention need not form the black matrix in order to prevent leakage of the light in regions other than the pixel regions, thereby basically solving the reduction of the opening ratio.

As shown in FIG. 6, the opposite direction reflector 32 according to the present invention may have a semi-circular shape, a triangular shape as well as a conical shape with a constant angle of inclination in a sectional view. In this case, the light introduced into the reflective region can be reflected in all directions.

Figure 7:
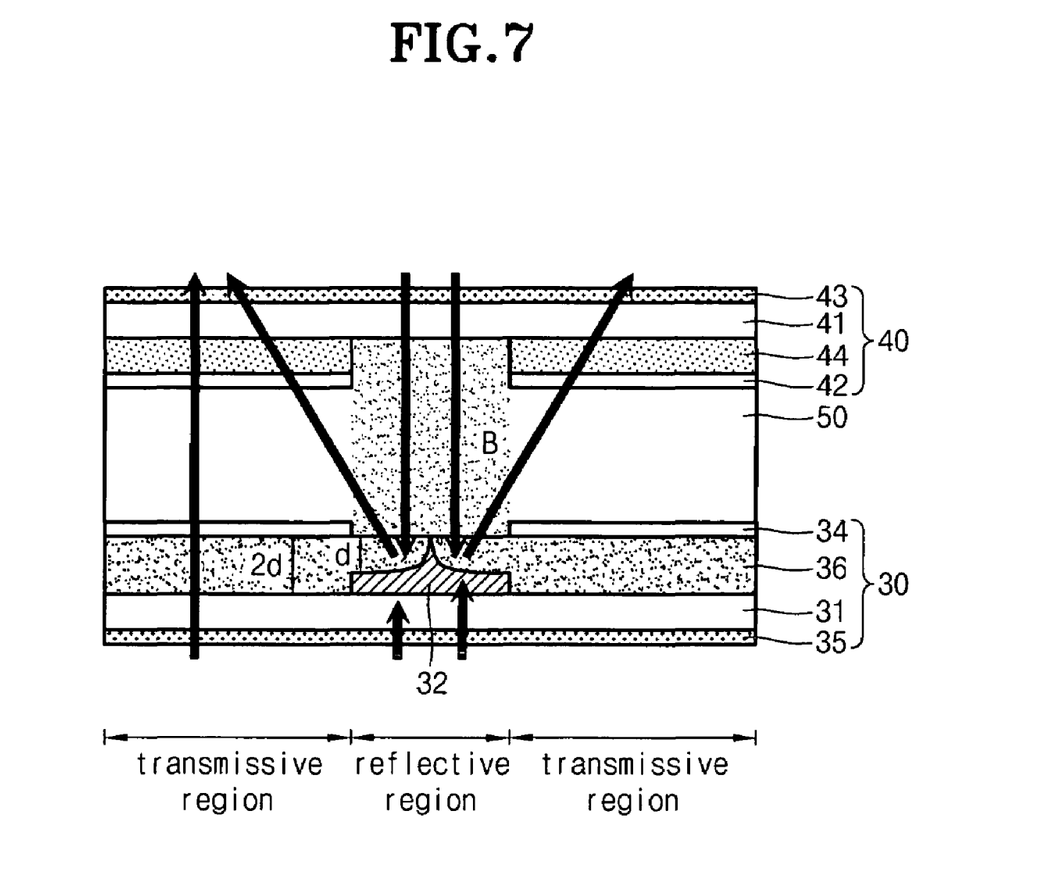
FIG. 7 is a sectional view showing a transflective liquid crystal display according to another embodiment of the present invention.

FIG. 7 is a sectional view showing a transflective liquid crystal display according to another embodiment of the present invention. Like reference numerals denote the same elements as those in FIG. 3. The description of the same elements as those in FIG. 3 will be omitted.

First, the transflective liquid crystal display according to another embodiment of the present invention has a single cell gap structure with a high efficiency of processes similar to the previous embodiment of the present invention. Further, in the transflective liquid crystal display of this embodiment, an opposite direction reflector 32 is disposed in a region, i.e. in the reflective region between the pixel regions respectively including a thin film transistor forming portion, which reflects the light introduced from outside toward the adjacent transmissive regions, like the opposite direction reflector 32 of the previous embodiment.

Furthermore, the transflective liquid crystal display of this embodiment includes a lower polarization plate 35 and an upper polarization plate 43 whose axes are parallel. This differs from the previous embodiment. Further, the transflective liquid crystal display of this embodiment has a liquid crystal layer 50, in which liquid crystals stand vertically when the electric voltage is not applied.

Specially, the transflective liquid crystal display of this embodiment includes a color filter 44 attached on an upper substrate 40, i.e. an inner surface of an upper glass substrate 41, so as to realize colors. At this time, the color filter 44 is selectively formed not in the reflective region but in the transmissive region in order to minimize the difference in the reappearance capability of the colors between the reflective and transmissive regions.

In the transflective liquid crystal display, further, since the liquid crystals stand vertically, the phase retardation area of the previous embodiment is transformed to a non-phase retardation area.

In the transflective liquid crystal display, in addition, as the color filter 44 is attached on the upper substrate 40, an organic resin film further covers the inner surface of the lower glass substrate 31 including the opposite direction reflector 32. At this time, the organic resin film 36 has a thickness of tow times more than that of the opposite direction reflector 32, in order to minimize a phase difference between the reflective region and the transmissive region, similarly to the color filter 44 of the previous embodiment.

In the transflective liquid crystal display of this embodiment, although the color filter 44 is attached on the upper substrate 40, the opposite direction reflector 32 is applied to the lower substrate 30 so as to reflect the light to only the transmissive region. Accordingly, there is almost no the difference in the reappearance capability of colors between the reflective and transmissive regions.

Description of the remaining structural elements of the transflective liquid crystal display according to this embodiment will be omitted. It is understood that the functions and effects of the rest structural elements are the same as those of the structural elements of the previous embodiment.

Figure 8A:
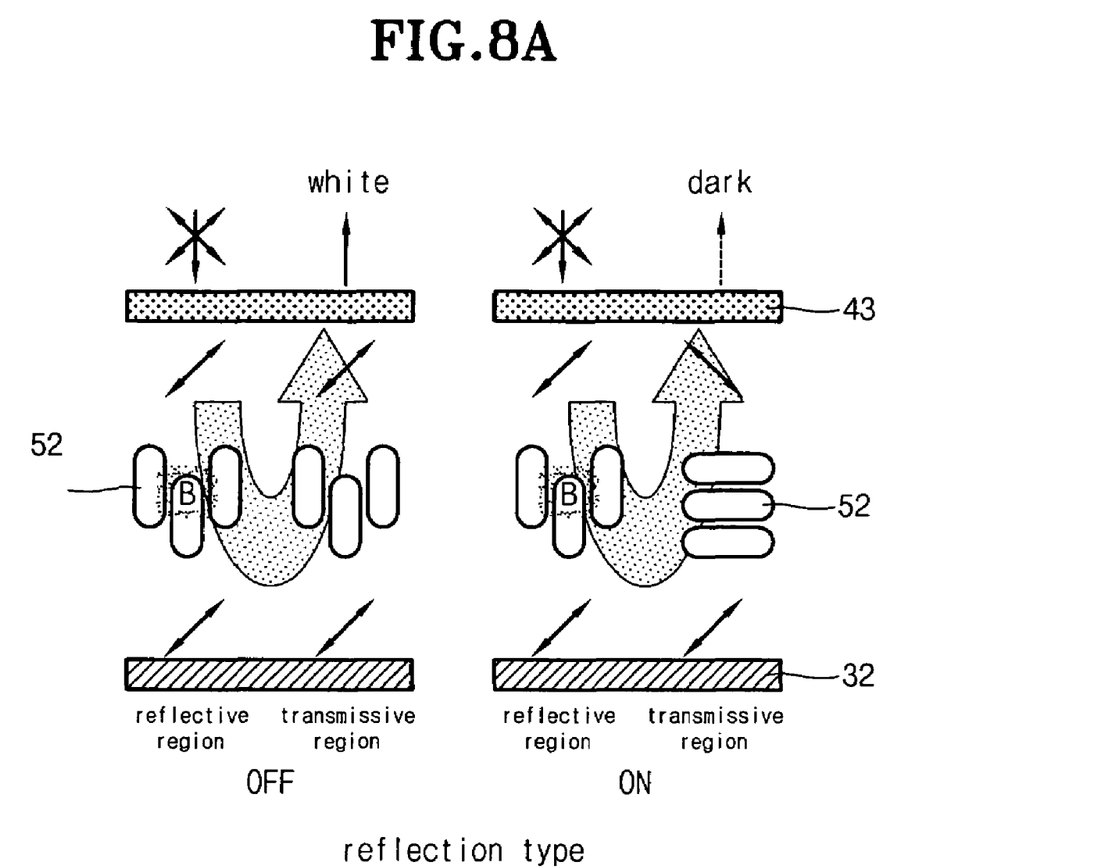
FIGS. 8A and 8B are views illustrating a phase change in the transflective liquid crystal display according to another embodiment of the present invention.
Figure 8B:
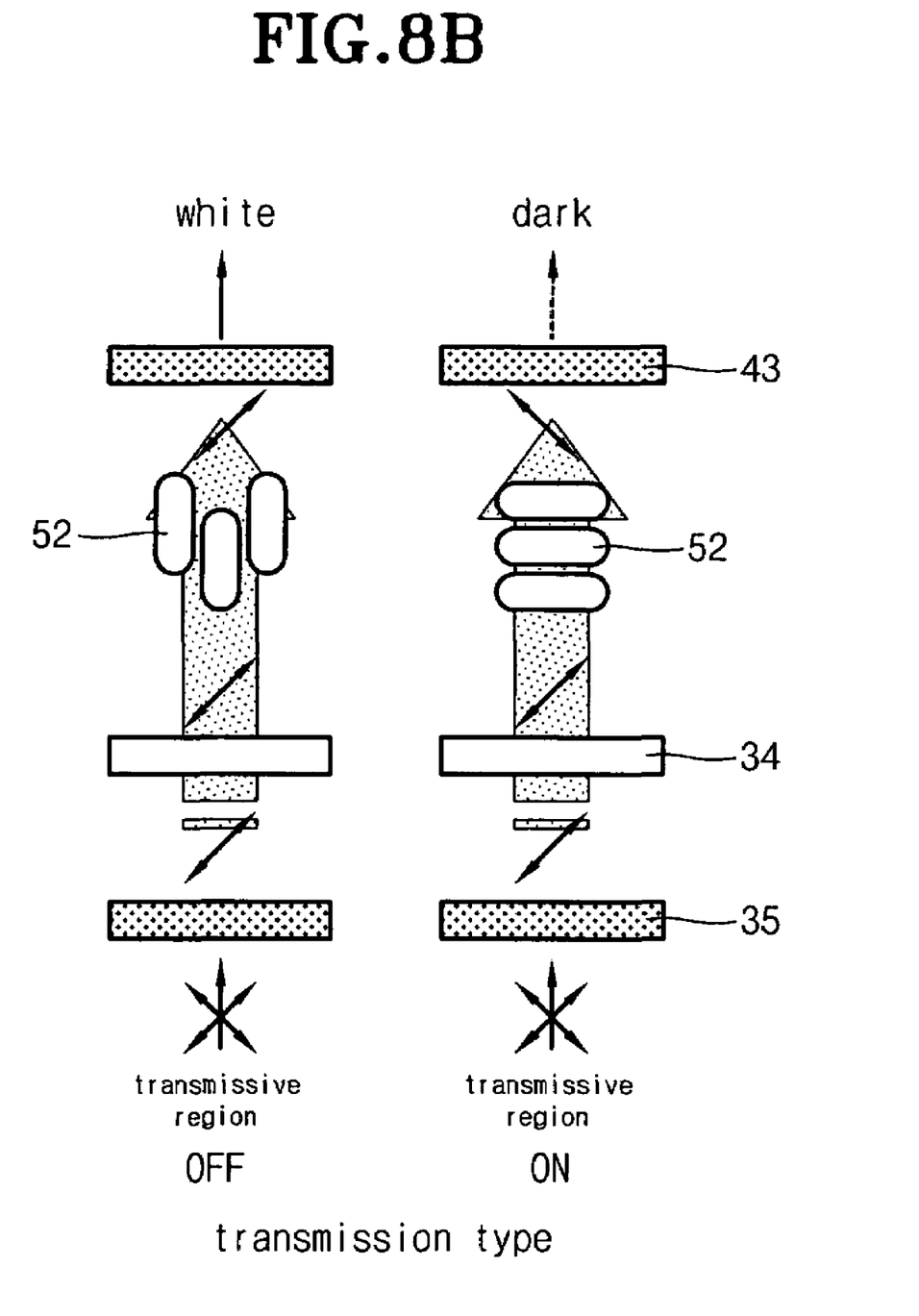

FIGS. 8A and 8B are views illustrating a phase change in the transflective liquid crystal display according to another embodiment of the present invention, in which FIG. 8A shows the phase change in a reflective region, and FIG. 8B shows the phase change in transmissive regions.

In the transflective liquid crystal display of this embodiment, to which a normal white vertical align mode is applied, the entire structure and effects are the same as those of the transflective liquid crystal display of FIG. 3. However, the transflective liquid crystal display of this embodiment includes the lower and upper polarization plates 35 and 43 of which the transmissive axes are parallel with each other, and liquid crystals 52 arranged in a VA mode in that the liquid crystals 52 stand vertically when electric voltage is applied to the liquid crystals 52. Further, a portion of a liquid crystal layer functioning as the phase retardation area A is changed as the non-phase retardation area B.

Referring to FIG. 8A, in the reflective region of the transflective liquid crystal display, since the light introduced from outside is transmitted through the upper polarization plate 43 without the phase change caused by the liquid crystals 52 in both the reflective and transmissive regions even though the electric voltage is not applied to the liquid crystal display, it is possible to realize a white state. On the other hand, when the electric voltage is applied to the liquid crystal display, the light introduced from outside is not subjected to the phase change in the reflective region but is rather subjected to the phase change of an angle of 90 degrees in the transmissive region, so that the light becomes a linear polarized light perpendicular with the transmissive axis of the upper polarization plate 43, and a dark state is realized.

Referring to FIG. 8B, in only the transmissive region, the light is subjected to the phase change in the same principle as that relating to the reflective region. That is, when electric voltage is not applied to the liquid crystal display, the lower and upper polarization plates 35 and 43 have transmissive axes which are parallel with each other. Further, since the light is not subjected to the phase change caused by the liquid crystals 52, the light is transmitted through the upper polarization plate 43 from the lower polarization plate 35 out of the liquid crystal display. Thus, it is possible to realize a white state. On the other hand, when the electric voltage is applied to the liquid crystal displays 52, since the light is subjected to the phase change by the angle of 90 degrees, the light arrived at the upper polarization plate 43 becomes a linear polarized light perpendicular to the transmissive axis of the upper polarization plate 43. Therefore, the light cannot be transmitted through the upper polarization plate 43, thereby causing a dark state to be realized.

As described above, the present invention adjusts the transmissive axis of the upper and lower polarization plates, the kind of the liquid crystal layer, and positions of electrodes for operating the liquid crystals, so as to control the phase of the light. This causes the transflective liquid crystal display having a single cell gap structure to easily have a high opening ratio.

In one embodiment of the present invention as described above, meanwhile, the lower and upper polarization plates are arranged so that their transmissive axes are intersected with each other. The liquid crystal layer is applied to the transflective liquid crystal display according to this embodiment, which includes the twist nematic type liquid crystal twisted at angle of 90 degrees when the electric voltage is not applied to the liquid crystal display. Specially, the color filter is attached on the lower substrate. In another embodiment of the present invention, the upper and lower polarization plates and the liquid crystal layer are arranged in the same manner as the previous embodiment. However, the color filter is attached on the upper substrate. In this case, the same effect as that of the previous embodiment can be obtained. Of course, it is understood that the other structural elements which were not specifically mentioned above are equal to those of the previous embodiment of the present invention.

In another embodiment of the present invention as described above, in addition, the liquid crystal layer is applied to the liquid crystal display, which stands vertically in a VA mode when the electric voltage is not applied to the liquid crystal display. Specially, the color filter is attached on the upper substrate. In the one embodiment of the present invention, however, the upper and lower polarization plates and the liquid crystal layer may be arranged in the same manner as of other embodiments of the present invention, while the color filter can be attached on the lower substrate. In this case, the same effect as that of the other embodiments can be obtained. Similarly, it is understood that the other elements, other than the above mentioned structural elements, are equal to those of other embodiments of the present invention.

As described above, the present invention employs a single cell gap structure, thereby reducing the difference of the transmittance between the reflective region and the transmissive region of the transflective liquid crystal display and removing a difficult process which can be caused by a step portion. Further, the present invention has the color filter attached on the lower substrate, so as to minimize the difference in the reappearance capability of the colors between the reflective region and the transmissive region. In addition, the present invention omits a very difficult process of forming a prominence and depression in order to improve the reflecibility, resulting in better facilitation of the processes of manufacturing the liquid crystal display. According to the present invention, further, the opposite direction reflector is disposed between the pixel regions, so as to exclude the formation of the black matrix. As a result, the efficient use of space can be increased, and it is possible to prevent a decrement in the opening ratio which occurs due to the black matrix. Furthermore, the present invention can excludes use of the phase compensation film by providing the fixing retardation area in the liquid crystal display, thereby reducing the manufacturing cost of the transflective liquid crystal display.

While a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A transflective liquid crystal display comprising:
    first and second substrates arranged to be opposite each other and respectively divided into reflective and transmissive regions;
    an opposite direction reflector disposed in the reflective region on an inner surface of the first substrate for reflecting introduced light to the transmissive regions adjacent to both sides of the reflector;
    a color filter formed on the whole inner surface of the first substrate including the opposite direction reflector;
    transparent electrodes formed on a portion of the color filter in the transmissive regions;
    a lower polarization plate attached on an outer surface of the first substrate;
    common electrodes formed in the transmissive regions on the inner surface of the second substrate;
    an upper polarization plate attached on the outer surface of the second substrate; and
    a liquid crystal layer interposed between the first and second substrates,
    wherein the reflective region and the transmissive region have a single cell gap, and the liquid crystal layer corresponding to the reflective region includes a fixing retardation area in which introduced light is subjected to a phase difference and
    wherein the fixing retardation area is an area of the first and second substrates in which electrodes for operating the liquid crystals are not formed.

2. The transflective liquid crystal display as claimed in claim 1, wherein the opposite direction reflector is formed in a region between pixel regions.

3. The transflective liquid crystal display as claimed in claim 2, wherein the opposite direction reflector acts as a black matrix in order to prevent light from leaking to a region other than the pixel regions.

4. The transflective liquid crystal display as claimed in claim 1, wherein the opposite direction reflector has a shape in which an upper surface of the reflector reflects the light introduced from outside in opposite directions.

5. The transflective liquid crystal display as claimed in claim 4, wherein the upper surface of the opposite direction reflector has one shape selected from a group of a conical shape having a constant angle of inclination, a circular shape, and a trigonal pyramid shape.

6. The transflective liquid crystal display as claimed in claim 1, wherein the opposite direction reflector has a height equal to half that of the color filter.

7. The transflective liquid crystal display as claimed in claim 1, wherein the common electrodes of the second substrate are formed not in the reflective region but only in the transmissive regions.

8. The transflective liquid crystal display as claimed in claim 1, wherein the lower polarization plate and the upper polarization plate are disposed so that their transmissive axes intersect with each other, and the liquid crystal layer is arranged in a twist nematic mode in which liquid crystals are twisted at an angle of 90 degrees when electric voltage is applied to the liquid crystal layer.

9. The transflective liquid crystal display as claimed in claim 1, wherein the lower polarization plate and the upper polarization plate are disposed so that their transmissive axes are parallel with each other, and the liquid crystal layer is arranged in a vertical align mode in which liquid crystals stand vertically when an electric voltage is not applied to the liquid crystal layer.

10. A transflective liquid crystal display, comprising:
    first and second substrates arranged to be opposite each other and respectively divided into reflective and transmissive regions;
    an opposite direction reflector disposed in the reflective region on an inner surface of the first substrate for reflecting introduced light to the transmissive regions adjacent to both sides of the reflector;
    an organic resin film formed on a whole inner surface of the first substrate including the opposite direction reflector;
    transparent electrodes formed on a portion of the organic resin film in the transmissive region;
    a lower polarization plate attached on an outer surface of the first substrate;
    a color filter formed in the transmissive regions on the inner surface of the second substrate;
    common electrodes formed on the color filter;
    an upper polarization plate attached on an outer surface of the second substrate; and
    a liquid crystal layer interposed between the first and second substrates,
    wherein the reflective region and the transmissive region have a single cell gap, and the liquid crystal layer corresponding to the reflective region includes a non-phase retardation area in which introduced light is not subjected to a phase difference; and
    wherein the non-phase retardation area is an area of the first and second substrates in which electrodes for operating the liquid crystals are not formed.

11. The transflective liquid crystal display as claimed in claim 10, wherein the opposite direction reflector is formed in a region between pixel regions.

12. The transflective liquid crystal display as claimed in claim 11, wherein the opposite direction reflector acts as a black matrix in order to prevent the light from leaking to a region other than the pixel regions.

13. The transflective liquid crystal display as claimed in claim 10, wherein the opposite direction reflector has a shape in which an upper surface of the reflector reflects the light introduced from outside to opposite directions.

14. The transflective liquid crystal display as claimed in claim 13, wherein the upper surface of the opposite direction reflector has a shape selected from a group of a conical shape having a constant angle of inclination, a circular shape, and a trigonal pyramid shape.

15. The transflective liquid crystal display as claimed in claim 10, wherein the opposite direction reflector has a height equal to half that of the color filter.

16. The transflective liquid crystal display as claimed in claim 10, wherein the color filter and the common electrodes of the second substrate are formed not in the reflective region but only in the transmissive regions.

17. The transflective liquid crystal display as claimed in claim 10, wherein the lower polarization plate and the upper polarization plate are disposed so that their transmissive axes are parallel with each other, and the liquid crystal layer is arranged in a vertical align mode in which liquid crystals stand vertically when an electric voltage is not applied to the liquid crystal layer.

18. The transflective liquid crystal display as claimed in claim 10, wherein the lower polarization plate and the upper polarization plate are disposed so that their transmissive axes intersect with each other, and the liquid crystal layer is arranged in a twist nematic mode in which liquid crystals are twisted at an angle of 90 degrees when an electric voltage is applied to the liquid crystal layer.

\* \* \* \* \*